United States Patent
Krapf et al.

(10) Patent No.: US 8,386,067 B2
(45) Date of Patent: Feb. 26, 2013

(54) MACHINE TOOL MONITORING DEVICE

(75) Inventors: Reiner Krapf, Reutlingen (DE); Heiko Braun, Leinfelden-Echterdingen (DE); Michael Mahler, Leinfelden-Echterdingen (DE); Alexander Werner Hees, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 355 days.

(21) Appl. No.: 12/439,884

(22) PCT Filed: Sep. 4, 2007

(86) PCT No.: PCT/EP2007/059239
§ 371 (c)(1),
(2), (4) Date: Sep. 23, 2009

(87) PCT Pub. No.: WO2008/028905
PCT Pub. Date: Mar. 13, 2008

(65) Prior Publication Data
US 2010/0057244 A1    Mar. 4, 2010

(30) Foreign Application Priority Data

Sep. 4, 2006  (DE) .......................... 10 2006 041 754
Aug. 30, 2007  (DE) .......................... 10 2007 041 098

(51) Int. Cl.
*G06F 19/00*    (2011.01)
(52) U.S. Cl. ................ 700/174; 700/177; 82/49; 83/73; 83/364
(58) Field of Classification Search .................. 700/174, 700/177; 82/49; 83/73, 364
See application file for complete search history.

(56) References Cited

U.S. PATENT DOCUMENTS

| | | | | |
|---|---|---|---|---|
| 4,272,800 A | * | 6/1981 | Asatourian | 362/489 |
| 5,389,939 A | * | 2/1995 | Tang et al. | 343/754 |
| 5,436,613 A | * | 7/1995 | Ghosh et al. | 340/573.1 |
| 6,204,754 B1 | * | 3/2001 | Berstis | 340/435 |
| 6,660,993 B2 | * | 12/2003 | Appleyard et al. | 250/221 |
| 7,084,779 B2 | * | 8/2006 | Uneyama | 340/680 |
| 7,225,712 B2 | * | 6/2007 | Gass et al. | 83/62.1 |
| 7,421,932 B1 | * | 9/2008 | Heinzmann et al. | 83/58 |
| 7,440,620 B1 | * | 10/2008 | Aartsen | 382/218 |
| 7,924,164 B1 | * | 4/2011 | Staerzl | 340/573.1 |
| 2002/0017178 A1 | * | 2/2002 | Gass et al. | 83/58 |
| 2004/0200329 A1 | * | 10/2004 | Sako | 83/58 |
| 2005/0057206 A1 | * | 3/2005 | Uneyama | 318/365 |
| 2005/0073438 A1 | * | 4/2005 | Rodgers et al. | 340/944 |

(Continued)

FOREIGN PATENT DOCUMENTS

EP      1 422 022      5/2004
WO      WO 94/24579    10/1994

OTHER PUBLICATIONS

Etsi et al: "Object discrimination and characterization applications operating in the frequency band 2, 2GHz to 8 GHz" ETSI Standards, European Telecommunications Standards Institute, Sophia-Antipo, FR. vol. DTRERM-RM, Nr. 44-2, v 1.1.1, May 2006, XP002459104, pp. 10-11, 17-20.

*Primary Examiner* — Michael D Masinick
(74) *Attorney, Agent, or Firm* — Merchant & Gould P.C.

(57) ABSTRACT

The invention relates to a machine tool monitoring device with an identification unity for identifying the operating situation of a machine tool. According to the invention, the machine tool monitoring device has at least one projection unit for defining at least one region to be monitored.

21 Claims, 4 Drawing Sheets

U.S. PATENT DOCUMENTS

2005/0141997 A1* 6/2005 Rast .................... 416/229 R
2006/0096425 A1 5/2006 Keller
2006/0101960 A1 5/2006 Smith et al.
2008/0240577 A1* 10/2008 Aartsen ...................... 382/218

* cited by examiner

MACHINE TOOL MONITORING DEVICE

TECHNICAL FIELD

The invention relates to a machine tool monitoring device according to the preamble of claim 1.

BACKGROUND

A machine tool monitoring device with an identification unit for identifying the operating situation of a machine tool is already known.

SUMMARY

The invention relates to a machine tool monitoring device with an identification unit for identifying the operating situation of a machine tool.

According to the invention, the machine tool monitoring device has at least one projection unit for defining at least one region to be monitored. By the term "projection unit", particularly a unit is to be understood in this context, which projects regions, respectively zones, in particular regions to be monitored, onto an object, preferably on a workpiece, and thereby preferably makes said regions identifiable, especially optically visible, to an operator of the device. In so doing, the regions, respectively zones, are arranged around a tool and consequently contribute to the safety of an operator during the operation of the machine tool. Furthermore, by the term "region to be monitored" particularly a region is understood, which is arranged around a tool and warns the operator of a danger due to being in close proximity to said machine tool; and/or an operation, respectively actuation, of the machine tool is decreased, respectively interrupted, in said region due to the presence of human tissue. By the term "operating situation", in particular a situation of an operation, respectively an actuation of the machine tool, respectively of a tool of the machine tool, is to hereby be understood. In so doing, a risk of injury to an operator as, for example, cutting off a finger, respectively a hand, can at least be reduced, respectively prevented. Preferably the operator is made aware of an impending danger by an optical definition of the regions to be monitored.

If the projection unit defines at least two regions to be monitored for the monitoring of an operating process of the machine tool, an advantageous graduation of the regions to be monitored into various safety regions can thereby be achieved. By the term "operating process of the machine tool", in particular an operation especially like sawing, cutting etc. by the machine tool can thereby be understood.

According to the invention, the projection unit furthermore has an optical projection unit, whereby an advantageous defining, in particular an optical defining, of the regions to be monitored can be achieved; and in so doing, an advantageous transmission of said regions to the operator can likewise be achieved.

According to the invention, the machine tool monitoring device additionally has an identification unit for identifying human or animal tissue and or a workpiece, whereby an additional safety function can be achieved for an operator and/or further objects of a human or animal nature. For example, if the identification occurs in the region of the tool, a warning would thereby be transmitted to the operator. Moreover, an advantageous discrimination between the workpiece and a hand of the operator can thereby be made possible.

In an additional configuration of the invention, it is proposed that the identification unit defines at least two regions to be monitored for the monitoring of an operating process of the machine tool, whereby advantageous, different safety stages of the machine tool monitoring device can be achieved. The regions to be monitored by the projection unit and the regions to be monitored by the identification unit advantageously at least partially overlap.

A particularly good visibility of the regions to be monitored by the identification unit can be achieved for an operator of the machine tool if the regions to be monitored by the projection unit define the regions to be monitored by the identification unit, in particular optically define.

A particularly high safety standard for an operator can be advantageously achieved and/or an impending danger to an operator can advantageously be made visible if at least one region to be monitored by the projection unit has an optical and/or visual appearance, which changes if human or animal tissue and/or a workpiece move into the region to be monitored. Moreover, this can cause an operator to unlearn a careless work practice, as, for example, repeatedly allowing a hand to rest in one of the regions being monitored.

According to the invention, a different mode of operation of the machine tool is furthermore assigned in each case to the regions being monitored when a human and/or animal tissue is identified. In so doing, a mode of operation of the machine tool can be adapted to a dangerous situation, which is immediately impending, and thereby a risk potential can be advantageously reduced for an operator during the operation of the hand-held machine tool.

If a warning mode is assigned to at least one of the regions to be monitored, an advantageous safety measure can be achieved for an operator by said operator being made aware that a body part of his is in a dangerous situation, which is indicated by a proximity to the tool of the machine tool.

The safety of the operator can be advantageously improved if the identification unit concurrently with a machine tool drive unit, which is provided to actuate the machine tool, is equipped to slow down the machine tool drive in the warning mode, and/or a safety cut-out of the machine tool is assigned to at least one of the regions to be monitored. In this context of a "safety cut-out", in particular an at least partially automatic cut-out and a fully automatic cut-out, which is especially advantageous, are to be understood, whereby a termination of the drive, respectively the operation of the machine tool occurs as soon as human or animal tissue is located in the region to be monitored, which is assigned to the safety cut-out. For this purpose, provision is preferably made for the identification unit to determine a position and/or speed, in particular to determine a position and/or speed of human or animal tissue and/or a workpiece by, for example, determining a dielectric constant. In so doing, an operation of a saw can be especially advantageously stopped when the workpiece is missing.

In a preferred embodiment of the invention, it is proposed that the machine tool monitoring device, in particular the identification unit, has at least one UWB radar sensor (ultra-wideband radar sensor). A high degree of information density and thereby an effective monitoring can be achieved with the utilization of ultra-wideband signals. By the term "UWB radar sensor", respectively "ultra-wideband radar sensor", in particular a radar sensor is to be understood in this context, by which an ultra-wideband radar signal can be produced, transmitted, received and/or evaluated. Especially an electromagnetic signal, which has a useful frequency range with a medium frequency in the frequency range of 1 GHz to 15 GHz and a frequency band width of at least 500 MHz, is understood by the term "ultra-wideband (or UWB) radar signal".

An especially effective identification can be achieved if the machine tool monitoring device, in particular the identification unit, has an antenna array. By the term "antenna array", a group of a plurality of antennas, which are different from each other, is to be understood in this context, said antennas being fed during the operation with a signal to be transmitted by means of a common signal production unit. The antenna array advantageously has at least one ultra-wideband radar antenna.

Accuracy when identifying the operating situation can be increased if the antenna array is configured as a phase-variable antenna array. By the term "phase-variable" antenna array, in particular an antenna array is to be understood in this context, to which at least one phase shifting means is assigned, which is provided for changing at least one relative phasing between two signals, which are emitted from different antennas of the antenna array. In an additional configuration of the invention, an infrared sensor, which advantageously detects a human or animal tissue by means of temperature using a reflection spectrum, a camera, which preferably possesses an intelligent object detection, and/or additional detection, respectively identification, elements can be alternatively employed instead of a UWB radar sensor and an antenna array.

The identification unit advantageously comprises a computation unit, which is provided for the purpose of identifying an operating situation by means of an evaluation of parameters, which is based on fuzzy and/or neuronal logic. A large and complex amount of information can be quickly evaluated by the computation unit based on the acquired signal with the aid of fuzzy logic. Fuzzy logic represents in particular logic, which assigns a probability value in a range between 0 (false) and 1 (true) to the occurrence of a certain event. Advantageous self-learning functions of the machine tool monitoring device can be achieved by neuronal logic.

According to the invention, the identification unit has a data bank, wherein an operating situation is assigned to a set of parameters, in an advantageous modification. An especially rapid identification process of an operating situation can thereby be achieved by examining a correlation between the acquired parameters and an operating situation.

BRIEF DESCRIPTION OF THE DRAWINGS

Additional advantages result from the following description of the drawing. Examples of embodiment of the invention are depicted in the drawing. The drawing, the description and the claims contain numerous characteristics in combination. The specialist will also advantageously consider the characteristics as individual entities and consolidate them into meaningful, further combinations.

The following are shown.

DETAILED DESCRIPTION

Figure 1:
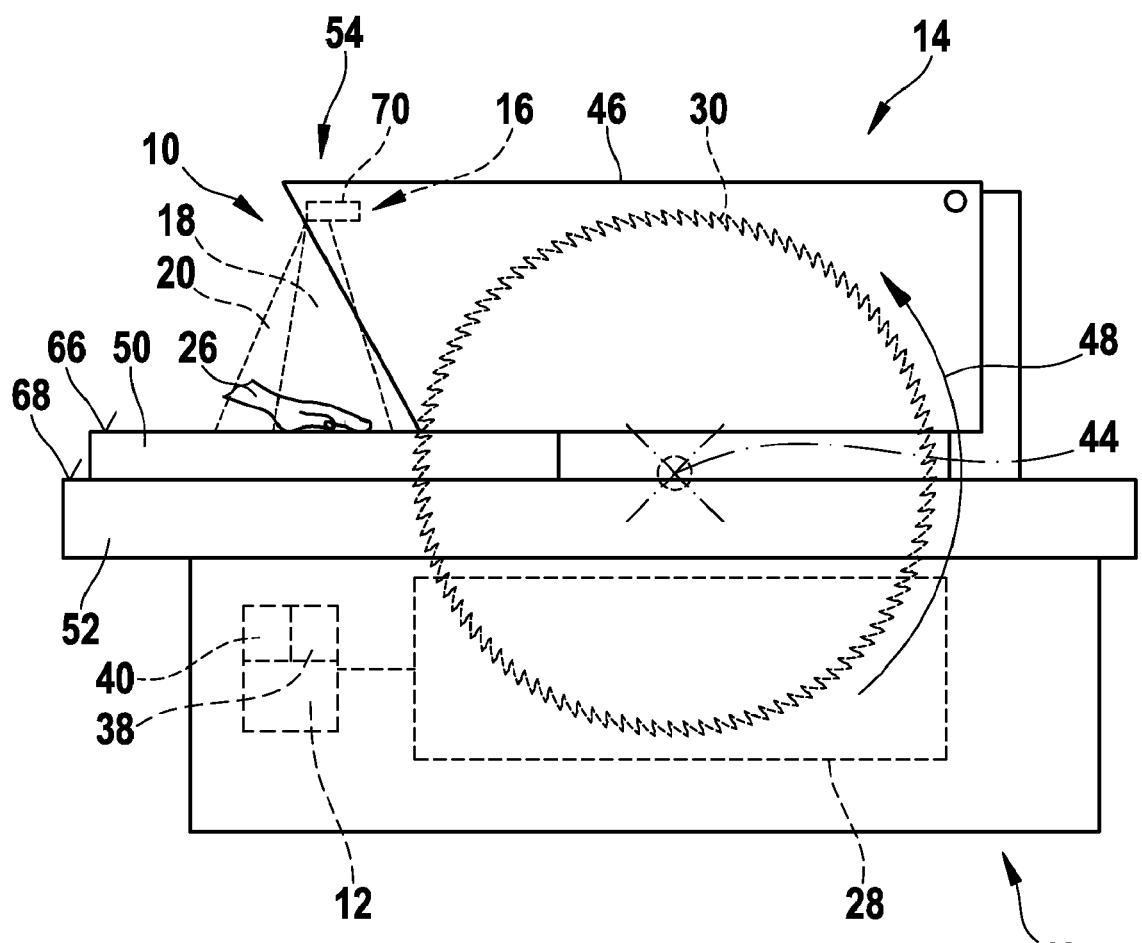
FIG. 1 is a machine tool with a machine tool monitoring device according to the invention in a schematic depiction.

A machine tool 14 composed of a circular table saw is schematically depicted in FIG. 1. The circular table saw comprises a tool 30 composed of a circular saw blade and a sawing table 42, wherein the tool 30 is rotationally fixed around a rotation axis 44. An actuation of the tool 30 results by means of a machine tool drive unit 28 of the machine tool 14. In addition the machine tool 14 comprises a protection cover 46, which encloses the tool 30 in a circumferential direction to said tool 30 in a region, which projects out of the machine tool 14 for the purpose of machining objects, respectively workpieces 50. Furthermore, the machine tool 14 has a machine tool monitoring device 10 with a projection unit 16 and an identification unit 12, which are provided to protect an operator from injury during the operation of the machine tool 14. The identification unit 12 is provided for an identification of an operating situation, in particular a mode of operation, of the machine tool 14 and for a detection of human and/or animal tissue 26 and/or the workpiece 50, as, for example, a hand of the operator, and is therefore disposed beneath a sawing table plate 52. In order to perform said identification, the identification unit 12 has a computation unit 38 and a data bank 40. The projection unit 16 is provided to project regions to be monitored 18, 20 onto the workpiece 50 to be machined during the operation of the machine tool 14. For this purpose, the projection unit 16 is disposed in a front region 54 by means of a holding device 56 (FIG. 2), which is configured separate from the protection cover 46 and is covered by said cover 46. In so doing, a protective function of the projection unit 16 is guaranteed even if the protection cover 46 has been removed. It is also basically conceivable for the projection unit 16 to also be directly integrated into, respectively disposed in, the protection cover 46. In so doing, the projection unit 16 consists of an optical projection unit 16.

Figure 2:
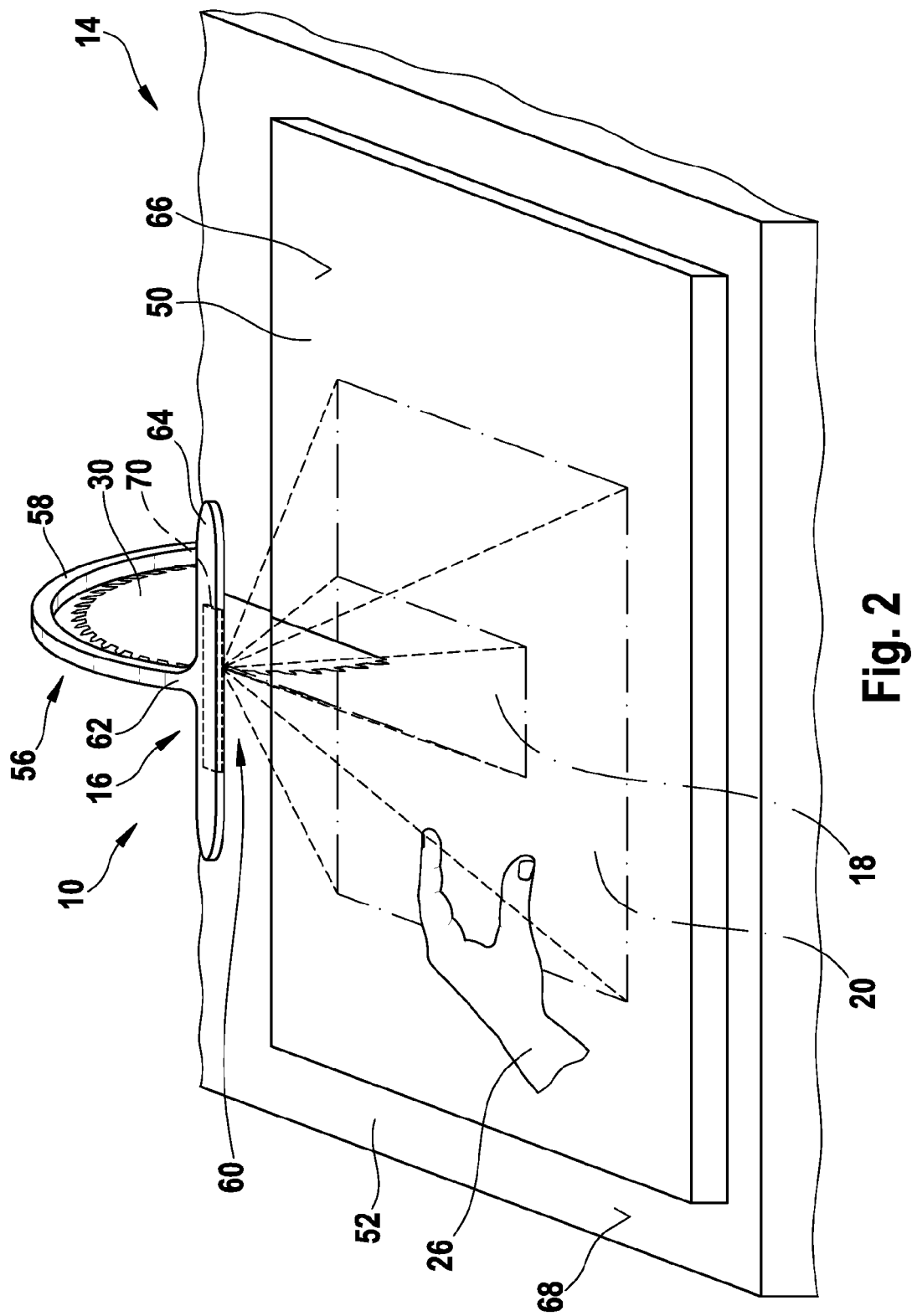
FIG. 2 is a partial region of the machine tool with the machine tool monitoring device in a perspective view.

FIG. 2 shows a partial region of the machine tool 14, which is composed of the circular table saw, with the tool 30. The holding device 56 has a holding arm 58, whereupon a retaining element 64 is disposed on a side facing a front region 60 of the tool 32. The front region 60 of the tool 30 is defined as the region of the tool 30, which is in contact with the workpiece 50 to be machined during an operating process. The retaining element 64 is provided for the disposal of the optical projection unit 16. Two regions to be monitored are defined 18, 20 using the projection unit 16, the two regions to be monitored 18, 20 being projected onto a workpiece surface 66, respectively a sawing table surface 68. The two regions to be monitored 18, 20 by the projection unit 16 are provided for the purpose of marking a danger zone, respectively two different danger zones, so that said zone(s) is optically visible to an operator during the operation of the machine tool 14. The first danger zone, respectively the first region to be monitored 18, is thereby disposed directly around the tool 30, respectively in the contact region of the tool 30 with the workpiece 50. The second danger zone, respectively the second region to be monitored 20, is disposed around the tool 30 and the first region to be monitored 18 at a greater distance to the tool 30 than the first region to be monitored 18.

The two regions to be monitored 18, 20 are radiated by the projection unit 16 with diverse, colored light for an optical discrimination between said regions 18, 20. For this purpose, the projection unit 16 has a laser unit 70, which projects laser light of a certain color onto each of the two regions to be monitored 18, 20; and in so doing, the laser light color of the first region to be monitored 18 varies from the laser light color of the second region to be monitored 20 so that an optical discriminability of the two regions to be monitored 18, 20 is provided. The colors of the laser light can furthermore be changed as a function of a color of the workpiece surface 66 by the operator of the machine tool 14 via an unspecified input unit. Moreover, the projection unit 16, respectively the laser unit 70, is provided for the purpose of changing an optical and/or visual appearance of the second region to be monitored 20 as soon as human tissue 26, especially a hand of the operator, or animal tissue 26 and/or the workpiece 50 moves into said region to be monitored 20. The change in the optical and/or visual appearance results from a change in the laser light color and/or a change in the laser light intensity, as, for example, a blinking of the laser light and/or additional light signals. Further optical and/or acoustic warning signals by the projection unit 16 as an alternative or in addition to the changes, which are shown, are conceivable at all times.

Figure 3:
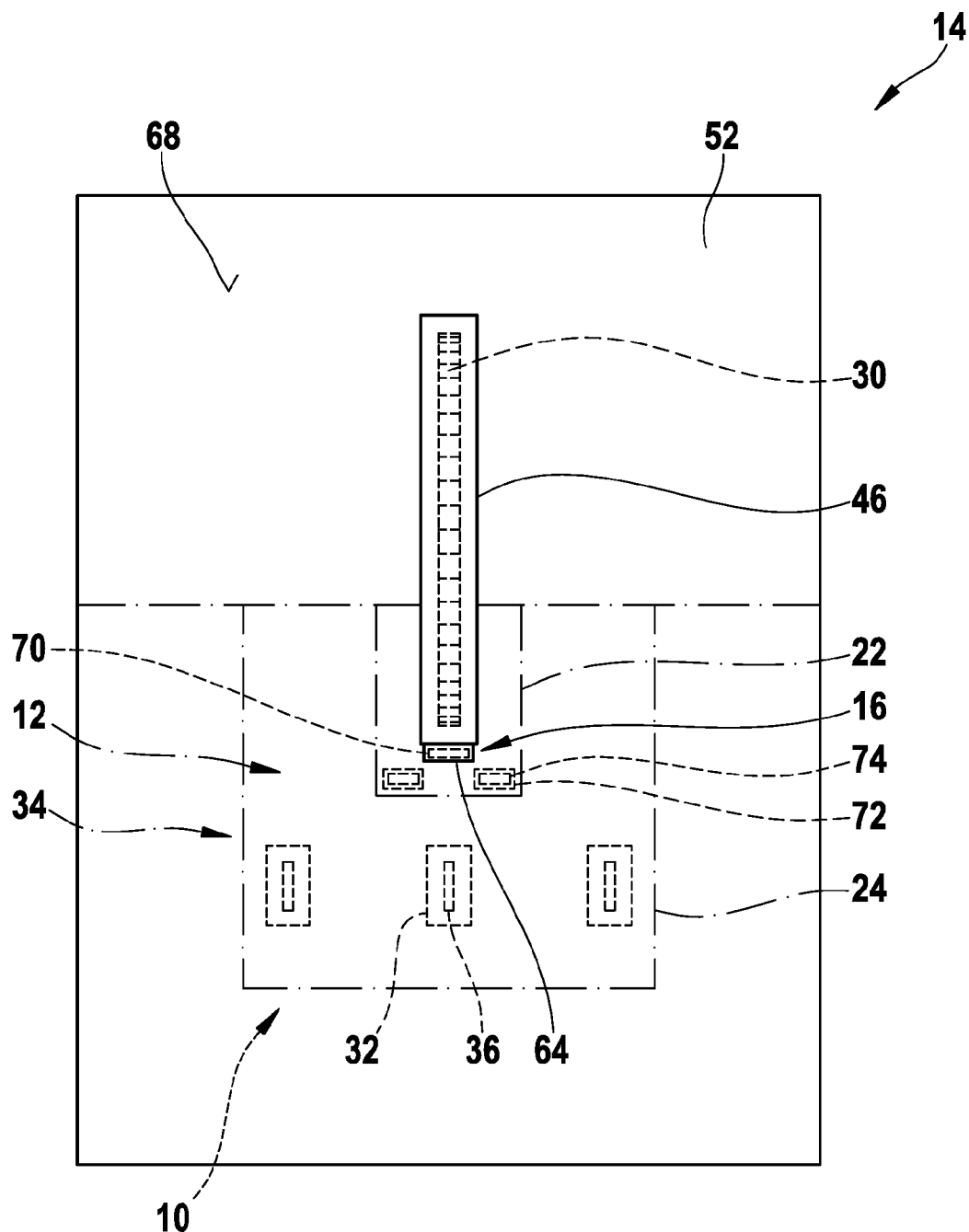
FIG. 3 is a partial region of the machine tool with the identification unit in a schematic depiction.

A detection of human or animal tissue 26 results by means of the identification unit 12 (FIG. 3). The identification unit 12 has two regions to be monitored 22, 24 for this purpose, which essentially correlate to the two regions to be monitored 18, 20 by the projection unit 16 so that the regions to be monitored 22, 24 by the identification unit 12 are optically marked off by the regions to be monitored 18, 20 by the projection unit 16 for an operator of the machine tool 14. Furthermore, provision is made for the two regions to be monitored 22, 24 to monitor an operating process, as, for example, sawing, of the machine tool 14. The identification unit 12 has a phase-variable antenna array 34 with a plurality of UWB radar sensors 32, 72, which are distributed onto both of the regions to be monitored 18, 20. The UWB radar sensors 32, 72 comprise in each case a UWB radar antenna 36, 74, which is provided for emitting, respectively receiving, an ultra-wideband radar signal. During the operation of the machine tool, provision is made for the identification unit 12 to determine the position of human or animal tissue 26 by means of the phase-variable antenna array 34, respectively the UWB radar sensors 32, 72. In an additional configuration of the invention, a determination of the speed of human or animal tissue 26, which is moving itself, as, for example, the movement of the hand of the operator, and/or of the workpiece 50 using the identification unit 12 is also furthermore alternatively or additionally conceivable.

A different mode of operation of the machine tool 14 is assigned in each case to the two regions to be monitored 22, 24 by the identification unit 12, which are equipped with UWB radar sensors 32, 72, as soon as a hand of the operator is located in one of the regions to be monitored 22, 24 by the identification unit 12. A warning mode of the machine tool 14 is thereby assigned to the second region to be monitored 24. Besides an output of an optical warning signal in the second region to be monitored 20 by the projection unit 16 by means of the projection unit 16, respectively the laser unit 70, in the warning mode of the machine tool 14, provision is made for the identification unit 12 together with the machine tool drive unit 28 to reduce the rotational speed of the tool 30. If the hand of the operator is located in the first region to be monitored 22 and consequently said hand is in the immediate proximity of the circular saw blade, the machine tool 14, respectively an operation of the circular saw blade, is automatically shutdown by the identification unit 12. In so doing, the hand situated in one of the regions to be monitored 22, 24 is ascertained in the accordant region to be monitored 22, 24 by means of the antenna array 34, respectively the UWB radar sensors 32, 72 concurrently with the computation unit 38, by means of which an evaluation of sensed data, respectively parameters of the UWB radar sensor 32, 72, occurs. An evaluation by the computation unit thereby results via fuzzy, respectively neuronal, logic. As soon as the hand is detected within one of the regions to be monitored 22, 24, the computation unit selects appropriate parameters for the warning mode, which is assigned to the detected operating situation, and sends said parameters to the machine tool drive unit 28 and/or to the projection unit 16 via an unspecified data line. The parameters are stored for this purpose in the data bank 40, the computation unit 38 selecting the parameter from a set of parameters, to which in each case an operating situation is assigned. Using the parameters selected by the computation unit 38, the projection unit 16 is induced to output warning signals in the second region to be monitored 20 by the projection unit 16: respectively the rotational speed of the circular saw blade, respectively a shutdown of a drive of the circular saw blade together with the machine tool drive unit 28, is set.

Figure 4:
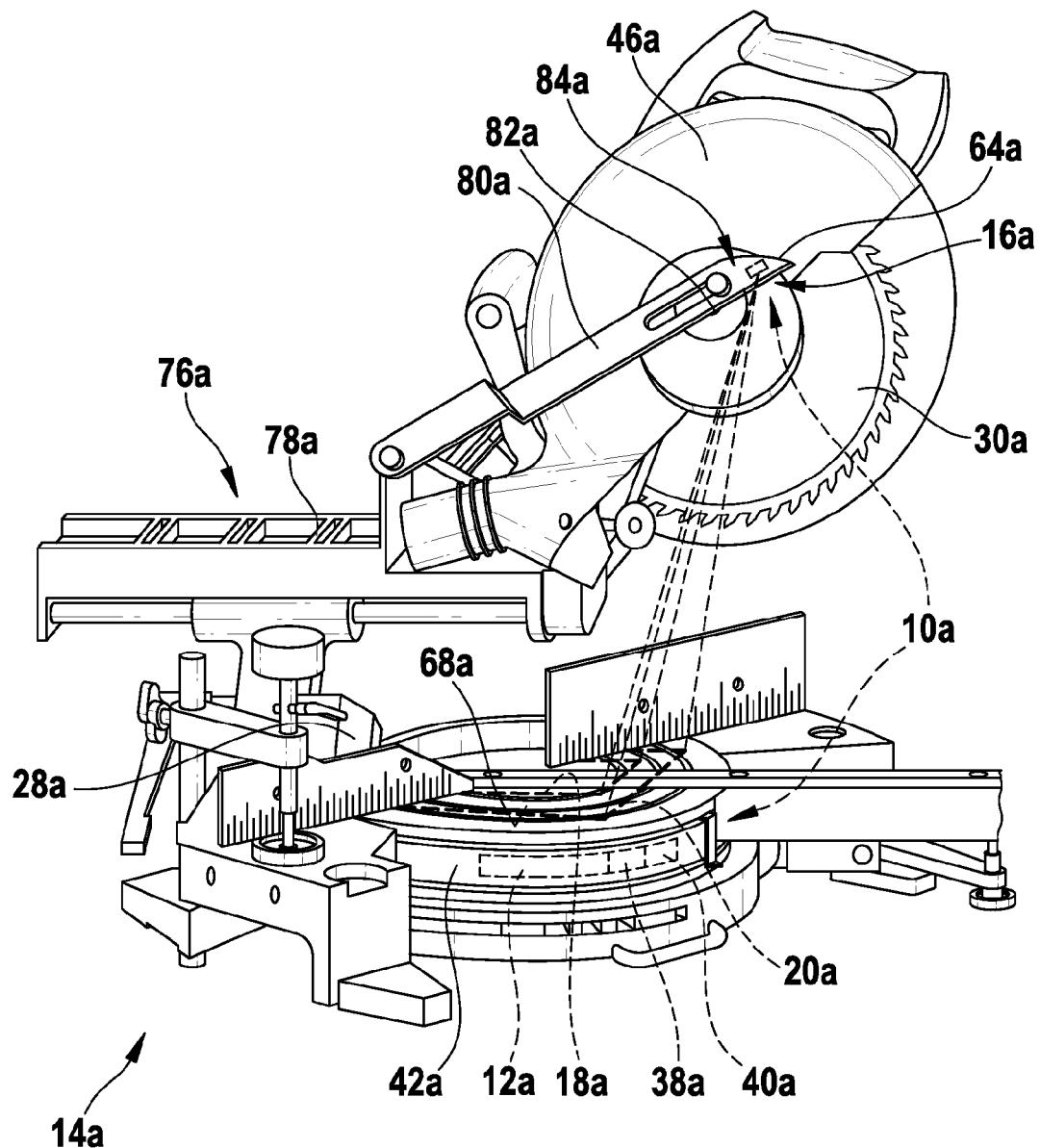
FIG. 4 is a partial region of an alternative machine tool with a machine tool monitoring device in a perspective view.

An alternative example of embodiment of a machine tool 14 to FIGS. 1 to 3 is depicted in FIG. 4. Components, characteristics and functions, which essentially remain the same, are basically denoted with the same reference numerals. In order to distinguish between the examples of embodiment, the letter "a" is however added to the reference numerals of the example of embodiment in FIG. 4. The following description essentially limits itself to the differences vis-à-vis the example of embodiment in FIGS. 1 to 3; and in so doing, reference can be made to the description of the example of embodiment in FIGS. 1 to 3 with respect to components, characteristics and functions, which remain the same.

The machine tool 14a comprises a panel sawing machine. The panel sawing machine has a tool 30a with a protection cover 46a, which are disposed so that they can be tilted around a tilting axis in relation to a sawing table 42a. Said tool 30a is also equipped with a machine tool monitoring device 10a. For this reason, a tool holding device 76a of the machine tool 14a has a retainer rail 78a, wherein the tool 30a together with the protection cover 46a can be tilted, and two holding arms 80a, which are provided for a securing of the position of the tool 30a and the protection cover 46a and are disposed on both sides of the tool 30a. The holding arms 80a are in each case disposed on the retainer rail 78a and in the region of a rotation axis 82a of the tool 30a at the protection cover 46a. Furthermore, the holding arms 80a have in each case a retaining element 64a on an end region 84a, which faces away from the retainer rail 78a, for the disposing of the projection unit 16a. A projection, respectively marking off of regions to be monitored 18a, 20a by the projection unit 16a, respectively a detection of human tissue within the regions to be monitored 22a, 24a by an identification unit 12a of the machine tool monitoring device 10a, takes place analogously to the description of the FIGS. 1 to 3.

The invention claimed is:

1. A machine tool monitoring device, comprising:
an identification unit for identifying an operating situation of a machine tool, the identification unit including at least one UWB radar sensor configured to determine position and/or speed of at least one of a human tissue and/or an animal tissue; and
at least one optical projection unit for defining at least one region to be monitored, wherein the at least one region to be monitored by the at least one optical projection unit marks at least one region to be monitored by the identification unit, wherein at least one region to be monitored by the at least one projection unit has an optical appearance, the at least one optical projection unit comprises:
a laser unit which projects a laser light, wherein if at least one of: a human tissue; and an animal tissue enters into said at least one region to be monitored, wherein the laser light changes at least one of color and light intensity resulting in a change in the optical appearance.

2. The machine tool monitoring device of claim 1, wherein the at least one projection unit defines at least two regions to be monitored for monitoring an operating process of the machine tool.

3. The machine tool monitoring device of claim 1, wherein the identification unit is configured for detecting at least one of: a human tissue; and an animal tissue.

4. The machine tool monitoring device of claim 1, wherein the identification unit is configured for detecting a workpiece.

5. The machine tool monitoring device of claim 2, wherein the identification unit defines at least two regions to be monitored for monitoring an operating process of the machine tool.

6. The machine tool monitoring device of claim 5, wherein the at least two regions to be monitored by the at least one projection unit and the at least two regions to be monitored by the identification unit at least partially overlap.

7. The machine tool monitoring device of claim 5, wherein the at least two regions to be monitored by the at least one projection unit optically mark off the at least two regions to be monitored by the identification unit.

8. The machine tool monitoring device of claim 1, wherein at least one region to be monitored by the at least one projection unit has a visual appearance, wherein the visual appearance changes if at least one of: a human tissue; an animal tissue; and a workpiece moves into said at least one region to be monitored.

9. The machine tool monitoring device of claim 5, wherein a different mode of operation of the machine tool is in each case assigned to the at least two regions to be monitored when at least one of: a human tissue; and an animal tissue is detected.

10. The machine tool monitoring device of claim 9, wherein a warning mode of the machine tool is assigned to at least one of the at least two regions to be monitored.

11. The machine tool monitoring device of claim 10, wherein the identification unit, concurrently with a machine tool drive unit, slows down an actuation of the machine tool in the warning mode, wherein the machine tool drive unit is configured for actuating a tool.

12. The machine tool monitoring device of claim 9, wherein a safety cut-out of the machine tool is assigned to at least one of the at least two regions to be monitored.

13. The machine tool monitoring device of claim 1, wherein the identification unit is configured to determine position and speed of at least one of: a human tissue; an animal tissue; and a workpiece.

14. The machine tool monitoring device of claim 1, wherein the machine tool monitoring device further comprises an antenna array.

15. The machine tool monitoring device of claim 14, wherein the identification unit is configured to include the antenna array.

16. The machine tool monitoring device of claim 15, wherein the antenna array comprises a phase-variable antenna array.

17. The machine tool monitoring device of claim 15, wherein the antenna array has at least one UWB radar antenna.

18. The machine tool monitoring device of claim 1, wherein the identification unit comprises a computation unit, wherein the computation unit is configured for identifying an operating situation by an evaluation based on at least one of: a fuzzy logic; and a neuronal logic.

19. The machine tool monitoring device of claim 1, wherein the identification unit comprises a data bank, and wherein an operating situation is assigned to a set of parameters in the data bank.

20. The machine tool monitoring device of claim 1, wherein the machine tool monitoring device is coupled to the machine tool.

21. A method of monitoring a machine tool, the method comprising:
monitoring at least one optical region defined by at least one optical projection unit; and
identifying an operating situation during an operating process of the machine tool using an identification unit including at least one UWB radar sensor configured to determine position and/or speed of at least one of a human tissue and/or an animal tissue within the at least one optical region to be monitored by a laser light, wherein at least one region to be monitored by the at least one projection unit has an optical appearance, wherein the optical appearance changes if at least one of: a human tissue; and an animal tissue enters into said at least one region to be monitored, and wherein a change in the optical appearance results from a change in at least one of: a color and an intensity of the laser light.

* * * * *